UNITED STATES PATENT OFFICE.

EDSON R. WOLCOTT, OF LOS ANGELES, CALIFORNIA, ASSIGNOR TO INTERNATIONAL PRECIPITATION COMPANY, OF LOS ANGELES, CALIFORNIA, A CORPORATION OF CALIFORNIA.

FORM OF POTASSIUM CHLORATE AND PROCESS OF PRODUCING THE SAME.

1,355,203.   Specification of Letters Patent.   Patented Oct. 12, 1920.

No Drawing.   Application filed March 17, 1919. Serial No. 283,168.

*To all whom it may concern:*

Be it known that I, EDSON R. WOLCOTT, a citizen of the United States, residing at Los Angeles, in the county of Los Angeles and State of California, have invented a new and useful Form of Potassium Chlorate and Processes of Producing the Same, of which the following is a specification.

This invention relates to a form of potassium chlorate having a habit of crystallization different from the ordinary form of potassium chlorate and especially adapted for use in the production of explosives and for other purposes for which potassium chlorate is now used.

Said new form of potassium chlorate is characterized by the habit of crystallization in the form of long, silky fibers or needles and has certain advantages over the ordinary potassium chlorate, particularly in that it is not so subject to explosion on grinding with easily combustible material, and is, therefore, especially adapted for the manufacture of safe explosives.

My invention is based on the treatment of ordinary potassium chlorate with water soluble products obtained by the action of sulfuric acid on unsaturated hydrocarbons, such as are present in California petroleums. When a solution of these water soluble compounds is added to a solution of ordinary potassium chlorate and the whole brought to the boiling temperature and then allowed to cool, the potassium chlorate crystallizes out from the concentrated solution in the form of long silky, or fibrous crystals instead of the usual plate-like crystals. The water soluble hydrocarbon derivatives become less soluble in the solution after heating as above, and rise to the top of the body of liquid, being lighter than water, and form a scum on the surface of the liquid, and this portion of the hydrocarbon derivative may be separated by decanting off the solution, whereupon the hydrocarbons then may again be dissolved in hot water and used to convert more ordinary potassium chlorate from the usual or plate form of crystals to those having the form of long, silky fibers.

A specific example of the operation of my process is as follows:

Equal parts of California crude oil, about 20° Bé. and fuming sulfuric acid were mixed and agitated for one hour, the acid being preferably added gradually so as not to heat the mixture above room temperature. The mixture was then allowed to stand for several hours, until a solid tar-like material had separated out on top, the residual acid being in the bottom of the beaker. This acid, which amounted to about one-third the total bulk was drawn off and the tar-like material (probably due to the sulfonation of the unsaturated hydrocarbons of the oil) was then dissolved in hot water to form a solution of specific gravity 1.066, *i. e.* a solution of about 6% strength.

To a saturated solution of 200 grams of ordinary potassium chlorate was then added 10 cc. of the above solution of water soluble hydrocarbon, and the whole diluted with water to a volume of 800 cc. The solution was then brought to a boil, filtered, and the filtrate allowed to crystallize. The resulting crystals were then removed from the mother liquor, dried, redissolved in water and recrystallized.

As will be apparent, the amount of this water soluble hydrocarbon compound in the above example is very small, being less than one third of one per cent. of the amount of the original chlorate present. Even smaller amounts may be used to produce a like result, although larger amounts may of course be used.

It will be understood that the above procedure is given merely as an example and that the procedure may be widely varied. Thus, for the manufacture of the water-soluble hydrocarbons, instead of fuming sulfuric acid, concentrated sulfuric acid or liquid sulfur-dioxid may be used, the amount of acid needed varying through wide limits, as does the temperature at which the reaction may be effected. My tests have shown that all grades of California oil from the residuum of topping plants to the very light oils found in some fields, may be used to produce the soluble hydrocarbons, above referred to.

In some cases, the water soluble derivative of an unsaturated hydrocarbon capable of affecting the habit of crystallization of potassium chlorate when treated therewith, may be commercially available by a by-produt of petroleum refining, or otherwise, and in such cases my process may utilize such product directly by heating it with ordinary potassium chlorate to convert the latter to a form having a fibrous habit of crystallization.

The crystalline product produced in accordance with the above example and purified by repeated crystallization, has substantially the same chemical composition as ordinary potassium chlorate, analyses indicating approximately 99% $KClO_3$.

My invention is not, however, limited to a compound of this degree of purity, as a considerable amount of impurity may be present without interfering with the practical use of this new material. It is, in fact, desirable in some cases to retain a certain proportion, say one-third of one per cent., more or less, of the water-soluble hydrocarbon derivative aforesaid in the solution during the crystallizing operation to insure the production of crystals in silky form, and in such cases a small amount of said hydrocarbon derivative will be present in the crystal mass. The hydrocarbon derivative so present is, in some cases at least, a desirable ingredient, as it forms a coating on the surface of the crystals tending to decrease the liability to explosion on grinding the crystals with easily combustible material.

Upon crystallographic examination, the essential optical properties of the crystals (long silky fibers) of my new form of potassium chlorate appear to be identical with the crystals (plate form) of ordinary potassium chlorate. The difference between the two forms appears to lie in the "habit" of relative development. This fibrous habit of crystallization is retained, at least for a considerable number of re-dissolving and re-crystallizing operations. I believe that I am the first to obtain crystals of potassium chlorate in this new habit.

In utilizing the new form of potassium chlorate in making explosives, it may be mixed with any suitable combustible compound, such as sugar, flour, or hydrocarbon, in the same manner as is now practised in the manufacture of the usual potassium chlorate explosives, the advantage being that with this modified form there is less liability to a premature or spontaneous explosion, of the finished mixture.

The mixture of modified potassium chlorate and of the hydrocarbon derivative used in making the same may, in some cases, be used without separation of such constituents, in forming an explosive.

The potassium chlorate, obtained by the above process, which may for convenience be termed "modified potassium chlorate", appears, when mixed with sulfur and ground in a mortar, to be less sensitive to explosion than ordinary potassium chlorate. This relative insensitiveness is probably due to a coating or some other form or association with the modified potassium chlorate crystals of a minute quantity of the soluble hydrocarbon used for producing the modified form of crystal.

I claim:

1. A chemical compound suitable for the manufacture of explosives and for other purposes, said compound corresponding substantially to the formula $KClO_3$ but having a silky or fibrous crystal habit.

2. A chemical compound suitable for the manufacture of explosives and for other purposes, said compound corresponding substantially to the formula $KClO_3$ but having a silky or fibrous crystal habit, the crystals having associated therewith a soluble hydrocarbon derivative.

3. A chemical compound suitable for the manufacture of explosives and for other purposes, said compound corresponding substantially to the formula $KClO_3$ but having a silky or fibrous crystal habit, the crystals having associated therewith a substance capable of diminishing the explosive tendency of potassium chlorate.

4. A composition of matter comprising a mixture of a hydrocarbon derivative, such as is formed by treating oil containing unsaturated hydrocarbons with sulfuric acid, and potassium chlorate having a fibrous crystal habit.

5. A process consisting in permitting potassium chlorate to crystallize in presence of a modifying agent capable of imparting to the crystals a fibrous crystal habit.

6. A process consisting in permitting potassium chlorate to crystallize in presence of a water-soluble hydrocarbon derivative capable of imparting to the crystals a fibrous crystal habit.

7. A process comprising treating unsaturated hydrocarbons, such as are present in California petroleum, with sulfuric acid to form a water-soluble hydrocarbon derivative; permitting potassium chlorate to crystallize in presence of such derivative, producing thereby crystals having a fibrous habit, and separating the crystals from the liquid.

In testimony whereof I have hereunto subscribed my name this 12th day of March 1919.

EDSON R. WOLCOTT.